(12) United States Patent
Aly et al.

(10) Patent No.: US 10,673,898 B2
(45) Date of Patent: *Jun. 2, 2020

(54) TWO-TIER DEEP ANALYSIS OF HTML TRAFFIC

(75) Inventors: Hosam Aly, Kanata (CA); Craig R. Conboy, Kanata (CA); Iosif Viorel Onut, Kanata (CA); Guy Podjarny, Ottawa (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 523 days.

This patent is subject to a terminal disclaimer.

(21) Appl. No.: 13/426,205

(22) Filed: Mar. 21, 2012

(65) Prior Publication Data

US 2012/0255006 A1     Oct. 4, 2012

Related U.S. Application Data

(63) Continuation of application No. 13/213,595, filed on Aug. 19, 2011.

(30) Foreign Application Priority Data

Aug. 25, 2010  (CA) ..................................... 2712542

(51) Int. Cl.
    *H04L 29/06*     (2006.01)
(52) U.S. Cl.
    CPC ........ *H04L 63/168* (2013.01); *H04L 63/1408* (2013.01)

(58) Field of Classification Search
    CPC ......................... H04L 63/168; H04L 63/1408
    See application file for complete search history.

(56) References Cited

U.S. PATENT DOCUMENTS

| 7,197,762 B2 | 3/2007 | Chan et al. |
| 7,331,061 B1 | 2/2008 | Ramsey et al. |
| 7,519,994 B2 | 4/2009 | Judge et al. |

(Continued)

FOREIGN PATENT DOCUMENTS

| CN | 101056222 A | 10/2007 |
| CN | 101431449 A | 5/2009 |

(Continued)

*Primary Examiner* — Mohammed Waliullah
(74) *Attorney, Agent, or Firm* — Cuenot, Forsythe & Kim, LLC (57) ABSTRACT

A computer-implemented process for two-tier deep analysis of hypertext transport protocol data, monitors Web traffic, receives a packet of Web traffic from a network to form a received packet, wherein the received packet represents Web traffic, and stores the Web traffic temporarily to form stored Web traffic. The computer-implemented process further determines whether the Web traffic is suspicious using a first tier analysis and responsive to a determination that the Web traffic is suspicious, consumes the stored Web traffic using a deep analysis module. The computer-implemented process further determines whether the stored Web traffic is a case of misuse using a second tier analysis and responsive to a determination that the stored Web traffic is a case of misuse, feeding back data about a malicious connection to an intrusion protection system before returning to monitor the Web traffic.

6 Claims, 6 Drawing Sheets

(56) References Cited

U.S. PATENT DOCUMENTS

| | | |
|---|---|---|
| 2005/0132230 A1 | 6/2005 | Miclea et al. |
| 2005/0182950 A1* | 8/2005 | Son et al. .................... 713/189 |
| 2005/0262556 A1* | 11/2005 | Waisman ............ H04L 63/0236 726/22 |
| 2007/0250930 A1 | 10/2007 | Aziz et al. |
| 2008/0134327 A1 | 6/2008 | Bharrat et al. |
| 2008/0134328 A1 | 6/2008 | Yang et al. |
| 2008/0134329 A1 | 6/2008 | Perreault et al. |
| 2008/0134330 A1* | 6/2008 | Kapoor .................. G06F 9/505 726/22 |
| 2008/0196104 A1* | 8/2008 | Tuvell .................... H04L 51/12 726/24 |
| 2008/0201772 A1 | 8/2008 | Mondaeev et al. |
| 2008/0219169 A1 | 9/2008 | Sargor et al. |
| 2008/0229415 A1* | 9/2008 | Kapoor et al. .................. 726/22 |
| 2008/0262991 A1 | 10/2008 | Kapoor et al. |
| 2008/0313738 A1 | 12/2008 | Enderby |
| 2009/0193248 A1 | 7/2009 | Carr |
| 2009/0323536 A1 | 12/2009 | Liu et al. |
| 2010/0071062 A1 | 3/2010 | Choyi et al. |

FOREIGN PATENT DOCUMENTS

| | | |
|---|---|---|
| WO | 0237730 A2 | 5/2002 |
| WO | 2009089701 A1 | 7/2009 |
| WO | 2010025776 A1 | 3/2010 |

* cited by examiner

TWO-TIER DEEP ANALYSIS OF HTML TRAFFIC

CROSS-REFERENCE TO RELATED APPLICATIONS

This application is a continuation application of U.S. application Ser. No. 13/213,595 entitled "Two-Tier Deep Analysis of HTML Traffic," filed on Aug. 19, 2011, which claims benefit of Canadian Patent Application Number 2712542, filed on Aug. 25, 2010, and entitled "Two-Tier Deep Analysis of HTML Traffic", which are fully incorporated herein by reference.

BACKGROUND

1. Technical Field

This disclosure relates generally to analysis of network traffic in a data processing system and more specifically to a hybrid architected two-tier deep analysis of hypertext transport protocol data in the data processing system.

2. Description of the Related Art Internet information theft has become a new way of crime against organizations worldwide. While network level attacks, for example, denial of service and probing represent a constant threat, it is the application level attacks that produce most of the damage. The damage occurs because by successfully exploiting an application vulnerability an attacker is able to claim private data associated with various aspects of an organization that could be used to jeopardize not only the reputation of a company but ultimately the identity of different individuals or organizations. Web attacks such as cross-site scripting, structured query language (SQL) injection, and information leakage are examples of successfully carried attacker scenarios that lead to identity theft.

The reality is that most of the application level attacks targeted to hypertext transport layer protocol (HTTP) appear as a consequence of a web design error, and can be easily prevented by input sanitization. Despite this, examples including cross-site scripting and SQL injection still remain among the most prevalent attacks based on the reports published by the Web Application Security Consortium located at the following Web site (http://www.webappsec.org/projects/statistics/).

While the poor design is typically the main reason attributed to these attacks, the main problem is organizations that own the websites are usually not the same as the organizations that develop the websites. The separation of control introduces an inherent latency between detection of attacks and resolution. Thus, even though mitigation techniques for most types of attacks exist and are relatively easy to perform, mitigation deployment is dependent on responsiveness of an organization, which is typically lacking in either knowledge or resources. Adding to this problem, organizations may be oblivious to exposure to this vulnerability and as a consequence not act accordingly to remediate the problem.

Current solutions to this problem may typically involve using an intrusion prevention system (IPS), or a Web application firewalls (WAF), or a Web application scanners (WAS). Each of the solutions has advantages and disadvantages, and is specialized in solving specific aspects of the problem thus providing a partial solution to the problem. For instance, due to the tremendous amounts of data exchanged in an organization, an IPS faces a computational challenge, struggling to keep up with the speed. Thus, the time an IPS spends on each network packet has to be minimal, forcing the IPS to look for patterns in each packet rather than analyzing the current packet in the context of the packet connection. In addition, the number of protocols degrades the situation, and as a consequence forces the IPS to minimize either the scope (for example, the number of protocols supported) of detection or the level of analysis per protocol performed. Thus, the footprint advantage that an IPS offers is mitigated by the lack of application layer detection or protection. On the other hand the WAF and WAS devices have a deeper knowledge of the web traffic, however while the WAF has basic response capabilities and is limited by deployment, the WAS works off line and is incapable of preventing attacks.

A solution taking advantage of all these three devices and enabling the devices to collaborate to overcome their respective challenges is impracticable to accomplish, especially because of the communication challenges, speed requirements, and the type of data that these three devices consume. An improved solution for eradicating web attacks is required to help organizations reduce or eliminate exposure to the web attack vulnerabilities.

SUMMARY

According to one embodiment, a computer-implemented process for two-tier deep analysis of hypertext transport protocol data, monitors Web traffic, receives a packet of Web traffic from a network to form a received packet, wherein the received packet represents Web traffic, stores the Web traffic temporarily to form stored Web traffic, and determines whether the Web traffic is suspicious using a first tier analysis. The computer-implemented process responsive to a determination that the Web traffic is suspicious, consumes the stored Web traffic using a deep analysis module, determines whether the stored Web traffic is a case of misuse using a second tier analysis and responsive to a determination that the stored Web traffic is a case of misuse, feeds back data about a malicious connection to an intrusion protection system.

BRIEF DESCRIPTION OF THE SEVERAL VIEWS OF THE DRAWINGS

For a more complete understanding of this disclosure, reference is now made to the following brief description, taken in conjunction with the accompanying drawings and detailed description, wherein like reference numerals represent like parts.

DETAILED DESCRIPTION

Although an illustrative implementation of one or more embodiments is provided below, the disclosed systems and/ or methods may be implemented using any number of techniques. This disclosure should in no way be limited to the illustrative implementations, drawings, and techniques illustrated below, including the exemplary designs and implementations illustrated and described herein, but may be modified within the scope of the appended claims along with their full scope of equivalents.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having computer readable program code embodied thereon.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, or a magnetic storage device or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with the computer-readable program code embodied therein, for example, either in baseband or as part of a carrier wave. Such a propagated signal may take a variety of forms, including but not limited to electro-magnetic, optical or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer-readable medium may be transmitted using any appropriate medium, including but not limited to wireless, wire line, optical fiber cable, RF, etc. or any suitable combination of the foregoing.

Computer program code for carrying out operations for aspects of the present disclosure may be written in any combination of one or more programming languages, including an object oriented programming language such as Java™, Smalltalk, C++, or the like and conventional procedural programming languages, such as the "C" programming language or similar programming languages. Java and all Java-based trademarks and logos are trademarks of Sun Microsystems, Inc., in the United States, other countries or both. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus, (systems), and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer or other programmable data processing apparatus to function in a particular manner, such that the instructions stored in the computer readable medium produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide processes for implementing the functions/acts specified in the flowchart and/or block diagram block or blocks.

Figure 1:
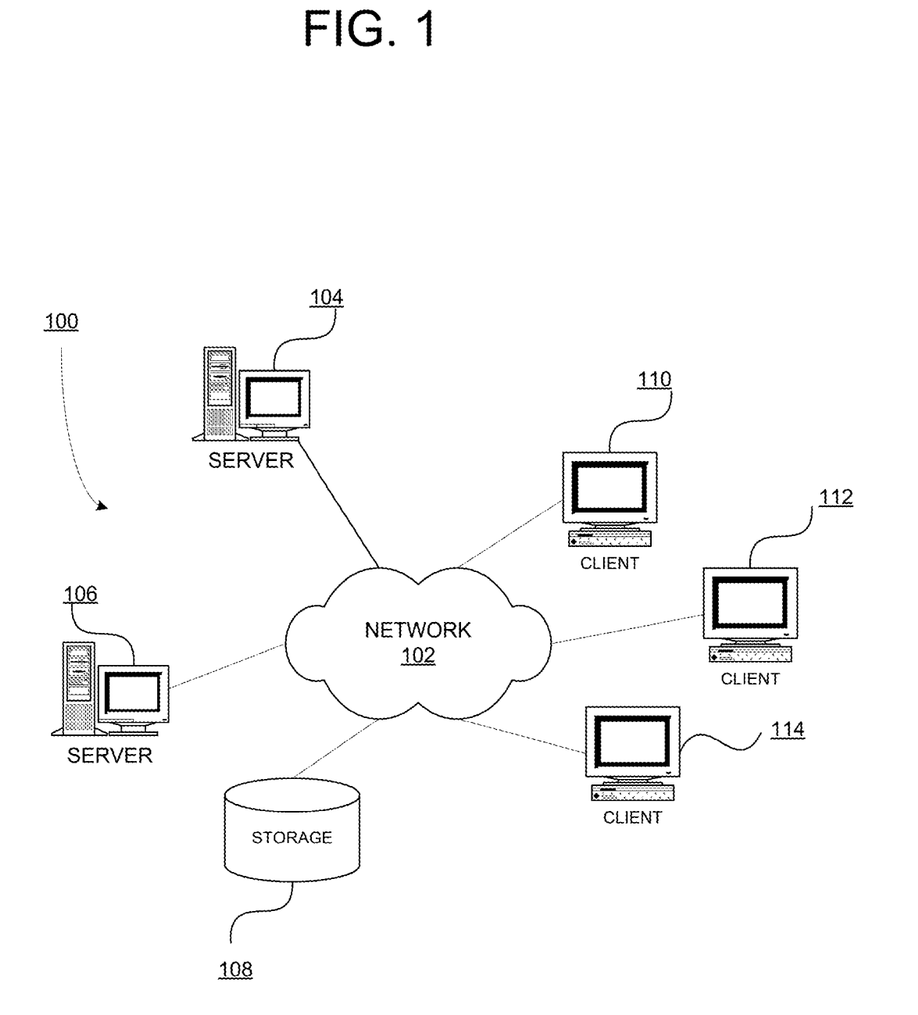
FIG. 1 is a block diagram of an exemplary network of data processing systems operable for various embodiments of the disclosure.
Figure 2:
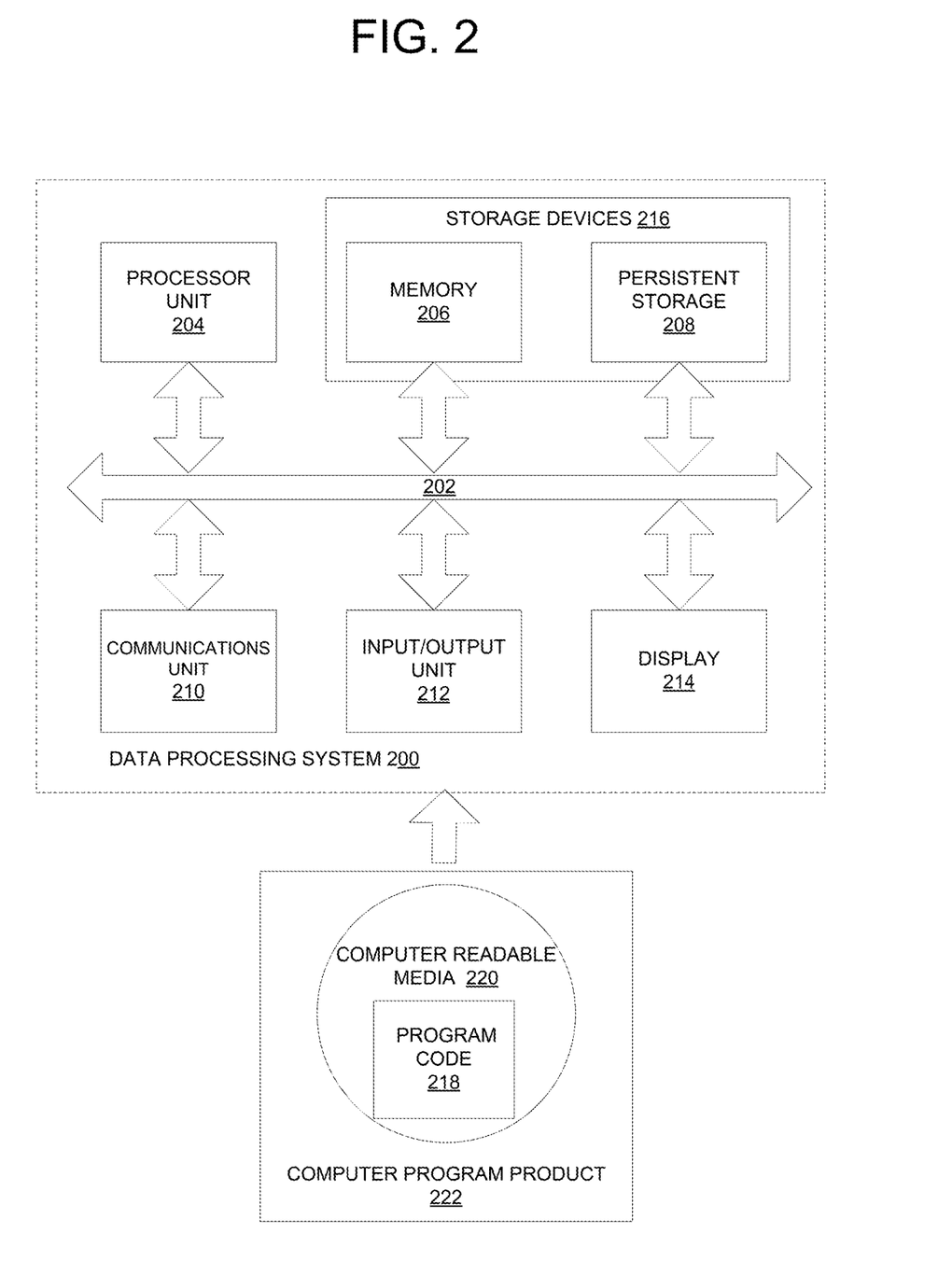
FIG. 2; is a block diagram of a data processing system for various embodiments of the disclosure.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

With reference to FIG. 1 a pictorial representation of a network of data processing systems in which illustrative embodiments may be implemented is presented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114.

Clients 110, 112, and 114 are clients to server 104 in this example. Network data processing system 100 may include additional servers, clients, and other devices not shown.

In the depicted example, network data processing system 100 is the Internet with network 102 representing a world-wide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

Turning now to FIG. 2 a block diagram of an exemplary data processing system operable for various embodiments of the disclosure is presented. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example without limitation, data, program code in functional form, and/or other suitable information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications and/or programs may be located in storage devices 216, which are in communication with processor unit 204 through communications fabric 202. In these illustrative examples the instructions are in a functional form on persistent storage 208. These instructions may be loaded into memory 206 for execution by processor unit 204. The processes of the different embodiments may be performed by processor unit 204 using computer-implemented instructions, which may be located in a memory, such as memory 206.

These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 218 is located in a functional form on computer readable media 220 that is selectively removable and may be loaded onto or transferred to data processing system 200 for execution by processor unit 204. Program code 218 and computer readable media 220 form computer program product 222 in these examples. In one example, computer readable media 220 may be in a tangible form, such as, for example, an optical or magnetic disc that is inserted or placed into a drive or other device that is part of non-transitory, persistent storage 208 for transfer onto a storage device, such as a hard drive that is part of persistent storage 208. In a tangible form, computer readable media 220 also may take the form of a persistent storage, such as a hard drive, a thumb drive, or a flash memory that is connected to data processing system 200. The tangible form of computer readable media 220 is also referred to as computer recordable storage media. In some instances, computer readable media 220 may not be removable.

Alternatively, program code 218 may be transferred to data processing system 200 from computer readable media 220 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

In some illustrative embodiments, program code 218 may be downloaded over a network to persistent storage 208 from another device or data processing system for use within data processing system 200. For instance, program code stored in a computer readable storage medium in a server data processing system may be downloaded over a network from the server to data processing system 200. The data processing system providing program code 218 may be a server computer, a client computer, or some other device capable of storing and transmitting program code 218.

According to an illustrative embodiment using data processing system 200 of FIG. 2 as an example of server 104 of network of data processing systems 100 of FIG. 1, processor unit 204 executes a computer-implemented process for two-tier deep analysis of hypertext transport protocol data. Processor unit 204 monitors Web traffic, receives a packet of Web traffic from a network, such as network 102 of data processing system 100 of FIG. 1, through communications unit 210 to form a received packet, wherein the received packet represents Web traffic. Processor unit 204 stores the Web traffic temporarily to form stored Web traffic, using storage devices 216 and determines whether the Web traffic is suspicious using a first tier analysis. Processor unit 204, responsive to a determination that the Web traffic is suspicious, consumes the stored Web traffic using a deep analysis module, determines whether the stored Web traffic is a case of misuse using a second tier analysis and responsive to a determination that the stored Web traffic is a case of misuse, feeds back data about a malicious connection to an intrusion protection system.

In another example, a computer-implemented process, using program code 218 stored in memory 206 or as a computer program product 222, for two-tier deep analysis of hypertext transport protocol data is presented. In the alternative embodiment, program code 218 containing the computer-implemented process may be stored within computer readable media 220 as computer program product 222 or in storage devices 216.

In another illustrative embodiment, the process for two-tier deep analysis of hypertext transport protocol data may be implemented in an apparatus comprising a communications fabric, a memory connected to the communications fabric, wherein the memory contains computer executable program code, a communications unit connected to the communications fabric, an input/output unit connected to the communications fabric, a display connected to the communications fabric, and a processor unit connected to the communications fabric. The processor unit of the apparatus executes the computer executable program code to direct the apparatus to perform the process.

Figure 3:
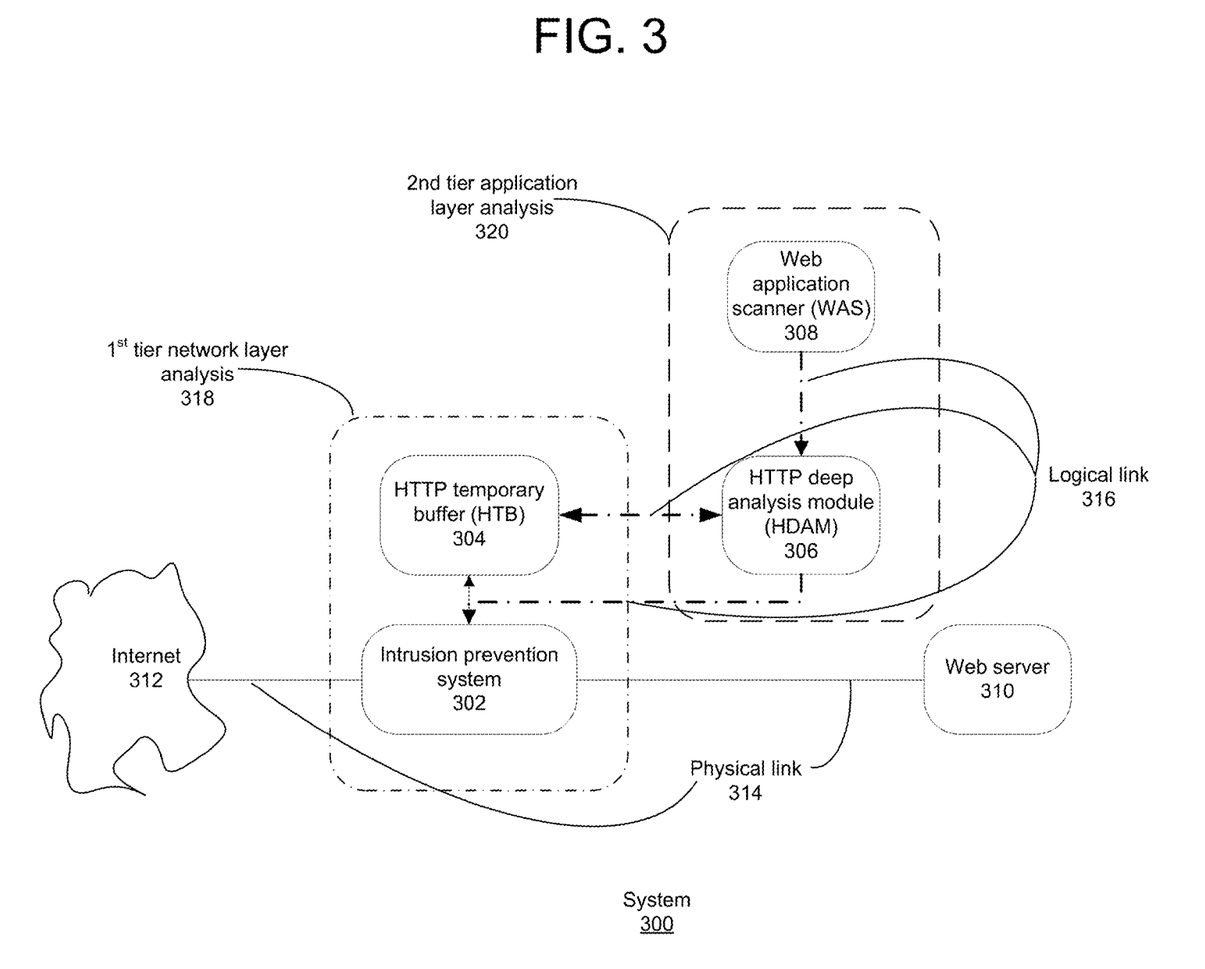
FIG. 3; is a block diagram of a two-tier analysis system in accordance with various embodiments of the disclosure.

With reference to FIG. 3 a block diagram of a two-tier analysis system, in accordance with one embodiment of the disclosure is presented. System 300 is an example embodiment of hybrid architecture in the form of a two-tier analysis system in accordance with the disclosure.

System 300 leverages the functionality of WAS 308 combined with that of IPS 302 to scan, detect and prevent web attacks from occurring in an online environment. An embodiment of the disclosed process enables proactive detection of a problem and constant response to attacks. Embodiments of system 300 use the advantage of a footprint that IPS 302 possesses, in combination with the deep analysis knowledge that WAS 308 provides, to form a two tier analysis of web data enabling system 300 to accurately build HTTP connection profiles based on all web traffic exchanged in each connection. The implementation of system 300 enables a network device to glance back at the data by indirectly monitoring web traffic history. Indirectly monitoring web traffic history dramatically reduces a number of false positive and false negative responses currently experienced by inline network devices.

System 300 is an example embodiment of the hybrid architecture comprising modules including intrusion prevention system 302, HTTP temporary buffer (HTB) 304, HTTP deep analysis module (HDAM) 306 and Web application scanner, WAS 308. These components may or may not be deployed on the same physical machine. IPS 302, typically deployed at the border of the protected network, has access to the traffic that all the Web servers of the protected network, such as Web server 310, exchange with Internet 312. In system 300, HTB 304 and HDAM 306 are co-located in proximity of IPS 302. In contrast, deployment of WAS 308 is not physically constrained to a particular location provided the WAS can access the website deployed on the Web server and communicate with the HDAM.

A physical network link, such as link 314 provides connectivity between Internet 312, IPS 302, HTB 304 and Web server 310. Logical links 316 provide a logical connection between HTB 304 and HDAM 306, HDAM 306 and IPS 302, and between HDAM 306 and WAS 308. A first tier of networking layer analysis is represented by the combination of IPS 302 and HTB 304. A second tier of application layer analysis is represented by the combination of HDAM 306 and WAS 308.

IPS 302 provides a capability to mirror the web traffic data to higher layer analysis modules, and enforce the dictated response actions on malicious web connections. The design typically has minimal impact on performance, while allowing other analysis modules to consume web traffic data.

The module HTB 304 temporarily stores the web traffic. HTB 304 works at the network layer, and thus has no knowledge of application layer (for example, web) connections. Instead HTB 304 uses Destination IP (DestIP), Destination Port (DestPort), Source IP (SrcIP), Source Port (SrcPort) and Protocol (Pt), in order to perform a preliminary classification of the traffic. HTB 304 may also be designed to use a subset of previously mentioned fields. For example, a common practice at the network layer is to ignore a client port in favor of a server port. Use of HTB 304 enables analysis of a packet in the context of a current packet connection and related packets from the current connection. In addition, information provided to HDAM 306 may also be used by HTB 304 to further classify web traffic. The module HDAM 306 is designed to consume web traffic stored in HTB 304, construct web connection profiles, and monitor for misuse. In addition, HDAM 306 also receives input from WAS 308. While IPS 302, HTB 304 and HDAM 306 devices work in real time, WAS 308 may work on a schedule basis to identify web vulnerabilities. HDAM 306 will feed back to IPS 302 data about malicious connections detected by HDAM 306.

While IPS 302 and HTB 304 will work at a network layer, HDAM 306 and WAS 308 functions at an application layer. This two-layer analysis enables the modules to cope with the network traffic, while performing inline deep analysis on web traffic that enables construction of cohesive HTTP connection profiles (using HDAM 306), and glance back at data when creating HTTP profiles (using HTB 304). A second tier analysis is only performed when needed as determined by the first tier analysis. The second tier analysis is triggered by anomalies determined using the first tier analysis. Therefore application level analysis is only performed when network level analysis detects a suspicious activity.

The two-layer analysis further enables performance of centralized correlation analysis on the web connections for all the web servers that IPS 302 is exposed to (using HDAM 306) and proactively determines web security issues (using information provided by WAS 308). The two-layer analysis implementation further attains maximum coverage of the Open Systems Interconnection (OSI) reference model while enabling response to web attacks at any level in the OSI model and to respond to web attacks as the attacks occur using real time feedback of HDAM 306 to IPS 302, in which a connection may be dropped while the attack occurs while also providing ease of deployment and maintainability.

Embodiments of system 300 differ from previous solutions by providing a hybrid collaborative process that overcomes challenges each individual device faces when operated in isolation. For example, none of IPS 302, WAS 308 and web application firewalls (WAF) could typically independently perform inline deep analysis, glance back to historical data, or centralized correlation analysis on multiple web servers. In addition, when web application firewalls filter the web traffic and therefore provide a very basic form of response, web application firewalls cannot actively protect an entire network due to deployment restrictions.

Moreover, system 300 typically provides better maintainability compared to the use of individual WAF devices.

The hybrid architecture of system 300 enhances the versatility of IPS 302 by allowing the device to perform a new layer of processing typically impossible to achieve otherwise. Combining data analysis at network and application layers enables the devices of system 300 to attain maximum coverage of the OSI model.

Figure 4:
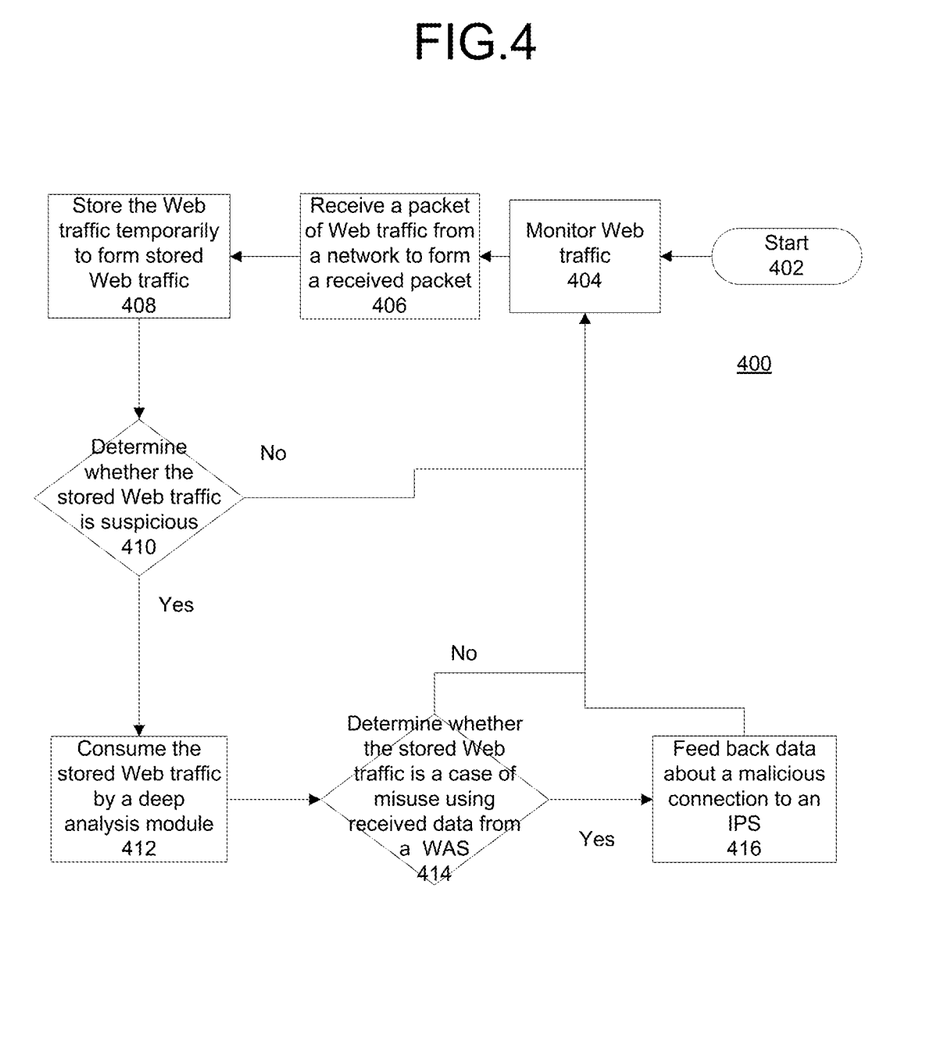
FIG. 4 is a flowchart of a process used in the two-tier analysis system of FIG. 3, in accordance with one embodiment of the disclosure.

With reference to FIG. 4 a flowchart of a process used in the two-tier analysis system of FIG. 3, in accordance with one embodiment of the disclosure is presented. Process 400 is an example of a two-tier deep analysis process implementation of the hybrid architecture of two-tier analysis in exemplary system 300 of FIG. 3.

Process 400 starts (step 402) and monitors Web traffic (step 404). Process 400 receives a packet of Web traffic from a network to form a received packet (step 406). Process 400 stores the Web traffic temporarily to form stored Web traffic (step 408). The stored Web traffic represents the received packet. Storing also includes a capability of process 400 to mirror the Web traffic to higher layer module and classify the packet of web traffic. The higher layer module refers to implementations of a layered network topology such as that defined in accordance with OSI. In the example, a higher layer module may be an HTTP temporary buffer (HTB). Classifications may typically include destination of the packet, size, origin or other meaningful information as determined by an installation for filtering and tracking purposes.

Process 400 determines whether the stored Web traffic is suspicious (step 410). The determination is made using only the rules of an intrusion prevention system. Step 410 is an example of a first tier analysis performed by an intrusion prevention system such as IPS 302 of system 300 of FIG. 3. When a determination is made that the stored Web traffic is suspicious, a "yes" result is obtained. When a determination is made that the stored Web traffic is not suspicious, a "no" result is obtained. When a "no" result is obtained in step 410, process 400 loops back to step 404 to monitor Web traffic as before.

When a "yes" result is obtained in step 410, process 400 consumes the stored Web traffic using a deep analysis module (step 412). The deep analysis module further constructs a profile for a Web connection using the new traffic and receives data from a Web application scanner (WAS).

Process 400 determines whether the stored Web traffic is a case of misuse using the received data from the WAS (step 414). Step 414 is an example of a second tier analysis performed by HDAM 306 of system 300 of FIG. 3. When a determination is made that the stored Web traffic is a case of misuse using the received data from the WAS, a "yes" result is obtained. When a determination is made that the stored Web traffic is not a case of misuse using the received data from the WAS, a "no" result is obtained.

When a "yes" result is obtained in step 414, process 400 feeds back data about a malicious connection to an IPS (step 416). Process 400 loops back to monitor the Web traffic in step 404 as before.

Figure 5:
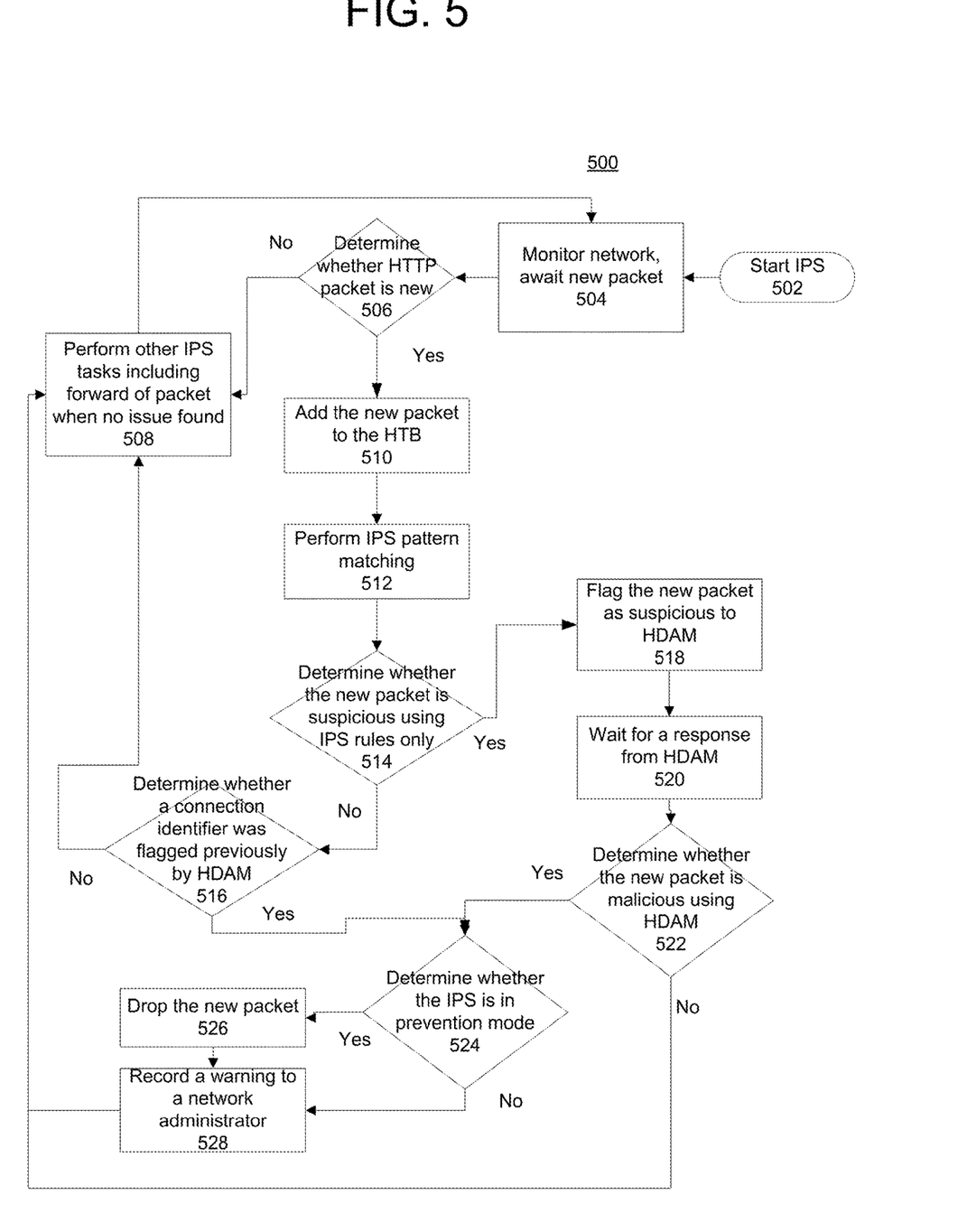
FIG. 5 is a flowchart of an intrusion prevention process using the two-tier analysis system of FIG. 3, in accordance with one embodiment of the disclosure.

With reference to FIG. 5 a flowchart of an intrusion prevention process using the two-tier analysis system of FIG. 3, in accordance with one embodiment of the disclosure is presented. Process 500 is an example of a first tier analysis performed by an intrusion prevention system such as IPS 302 of system 300 of FIG. 3 in accordance with the disclosure.

Process 500 starts (step 502) and monitors the network waiting for a new packet (step 504). Process 500 determines whether the network (HTTP) packet is a new packet (step 506). Responsive to a determination that the intrusion prevention system (IPS) detects a new (HTTP) packet, a "yes" result is obtained. When a determination is made that the IPS does not detect a new packet, a "no" result is obtained. When a "no" result is obtained in step 506, process 500 performs other IPS tasks and possibly forwards the packet to a destination when no other issues are identified (step 508).

When a "yes" is obtained the IPS forwards the new packet to the HTTP temporary buffer (HTB) (step 510). Process 500 also performs pattern matching as a check on the packet (step 512). Process 500 further determines whether the new packet is malicious (514). The determination is made with respect to IPS rules only. Numerous performance constraints on the IPS require rules used to check for malicious packets to be simple pattern matching tasks against a payload of the current packet. In other words, the IPS performs an initial simplistic check over encountered HTTP packets.

When a determination is made that the packet is malicious, a "yes" result is obtained. When a determination is made that the packet is not malicious, a "no" result is obtained. When a "yes" result is obtained in step 514, process 500 causes the IPS to flag the new packet as suspicious to the HTTP deep analysis module (HDAM) (step 518). Process 500 waits for a response from HDAM (step 520). While waiting time need be minimal, this check is important because the HDAM created a profile of the current HTTP connection for the new packet and is in a better position to quickly decide whether the new packet is malicious. This step typically eliminates false positives (FP) experienced by the IPS in previous solutions. For example, a false positive may occur for file transfers, which sometimes seem to be malicious at a network level especially for large files.

Process 500 determines whether the new packet is malicious using HDAM (step 522). HDAM would have no problem distinguishing between those instances because HDAM would have historical data of the connection and an understanding of the current data exchange. When a determination is made that the new packet is malicious using HDAM, a "yes" result is obtained. When a determination is made that the new packet is not malicious using HDAM, a "no" result is obtained. When a "yes" result is obtained, the HDAM also deems that the current data exchange is malicious then process 500 determines whether the IPS is in prevention mode (step 524). When a "no" result is obtained, process 500 determines loops back to step 508 to process as before.

When a "no" result is obtained in step 514, process 500, using the IPS, determines whether a connection identifier, associated with the new packet, was previously flagged by the HDAM as being suspicious (step 516). When a determination is made that a connection identifier associated with the new packet was not previously flagged by the HDAM as being suspicious process 500 loops back to step 508 as before. When a determination is made that a connection identifier associated with the new packet was previously flagged by the HDAM as being suspicious process 500 determines whether the IPS is in prevention mode (step 524).

When a determination is made that the IPS is in prevention mode, a "yes" result is obtained. When a determination is made that the IPS is not in prevention mode, a "no" result is obtained. When a "yes" result is obtained in step 524, process 500 proceeds in discarding or dropping the new packet (step 526). Process 500 records a warning to a network administrator (step 528) and loops back to perform step 508 as before. The warning typically comprises notifying a user (administrator) of the potential intrusion. When a "no" result is obtained in step 524, process 500 proceeds to step 528 to record a warning as before. Checking IPS status is performed to eliminate false negatives (FN) the IPS may introduce, for example, in a scenario where a cross-site scripting attack may be interpreted as normal traffic at a network level and therefore missed by the IPS. However, by creating application level profiles, the HDAM would be able to detect the intrusion. Using another example, a packet may contain non-malicious content belonging to a malicious connection previously flagged by the HDAM. To store a list of suspicious connections, the IPS could maintain the list in a hash table. The stored list would require continuous updates by the HDAM.

When neither the IPS nor the HDAM find suspicious content, the new packet can be forwarded to the packet destination. The example flowchart does not contain details about other tasks an IPS performs since those tasks are beyond the scope of the current disclosure. Furthermore, the IPS may be replaced by another network level device having a capability of sniffing the packets, for example, an intrusion detection system (IDS).

Figure 6:
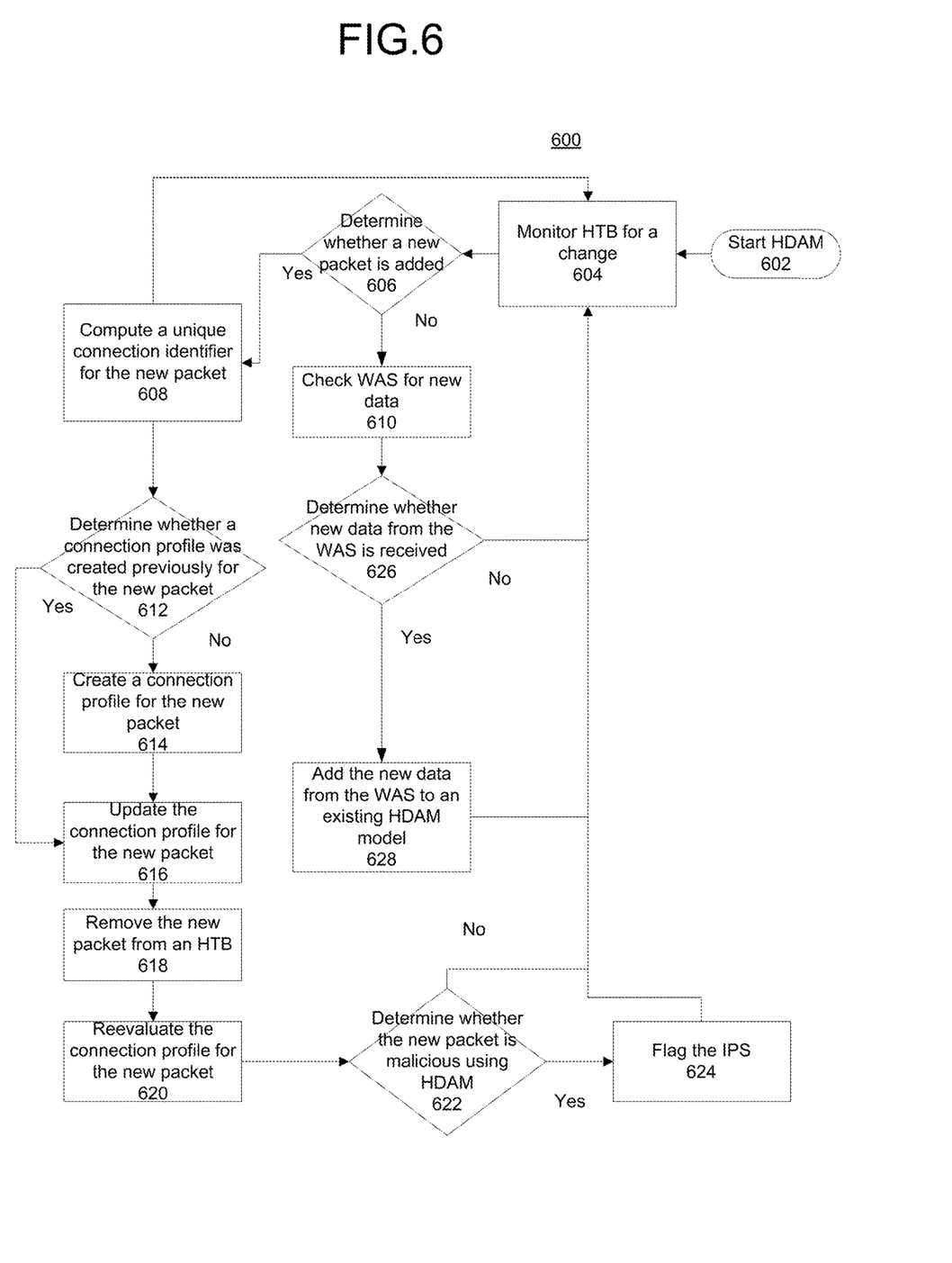
FIG. 6 is a flowchart of a deep analysis process using the two-tier analysis system of FIG. 3, in accordance with one embodiment of the disclosure.

With reference to FIG. 6 is a flowchart of a deep analysis process using the two-tier analysis system of FIG. 3, in accordance with one embodiment of the disclosure. Process 600 is an example of a second tier analysis performed by HDAM 306 of system 300 of FIG. 3 in accordance with the disclosure.

HDAM 306 of system 300 of FIG. 3 can be seen as a separate process that runs in parallel with process 500 of FIG. 5 using IPS 302 of system 300 of FIG. 3. A main role of HDAM is to analyze data stored in HTB 304 of system 300 of FIG. 3. HDAM differs from the processing of an IPS because HDAM works at the OSI application layer.

Process 600 starts (step 602) and continuously monitors an HTD for changes (step 604). When a packet is added by the IPS, the HDAM determines whether a new packet was added (step 606). When a determination is made that a new packet was added, a "yes" result is obtained. When a determination is made that a new packet was not added, a "no" result is obtained.

When a "yes" result is obtained in step 606, process 600 computes a unique connection identifier for the new packet (step 608). Process 600 determines whether a connection profile was previously created for the new packet (step 612). When a determination is made that a connection profile was previously created for the new packet, a "yes" result is obtained. When a determination is made that a connection profile was not previously created for the new packet, a "no" result is obtained. When a "no" result is obtained process 600 creates a new connection profile for the new packet (step 614). The profile creation that will happen in the HDAM is not described herein because the profile creation can use any of the currently existing technologies, for example, WAF technologies, and is accordingly out of the scope of this disclosure.

When a "yes" result is obtained in step 612, process 600 updates the connection profile for the new packet (step 616). Updating uses data in the new packet. Process 600 removes the new packet from the HTB (step 618). Process 600 re-evaluates the connection profile for the new packet (step 620). Process 600 determines whether the connection for the new packet is malicious using HDAM (step 622). When a determination is made that the connection for the new packet is malicious, a "yes" result is obtained. When a determination is made that the connection for the new packet is not malicious, a "no" result is obtained. When a "yes" result is obtained, process 600 flags the IPS (step 624) and loops back to step 604. The connection-checking task is performed asynchronously because both the IPS and HDAM are tracking the connections. When the new (current) packet has been forwarded by the IPS, but HDAM deems the connection to be malicious future packets belonging to the same connection will be treated accordingly.

Returning to step 606, when a "no" result is obtained in step 606, the HDAM checks the Web application scanner (WAS) for new data (step 610). Process 600 determines whether data received from the WAS is new data (step 626). When a determination is made that the data received from the WAS is new data, a "yes" result is obtained. When a determination is made that the data received from the WAS is not new data, a "no" result is obtained. Process 600 also periodically checks for external data that a WAS may send. This type of data is typically essential for further enhancing the connection profiles, however the system will function at a lower performance even without the data. For example, when the WAS determines a particular server is susceptible to structured query language (SQL) injection attacks, and a SQL injection is identified with that server, the connection needs to be stopped immediately since an exploitation will occur otherwise.

When a "yes" result is obtained in step 626, process 600 adds the new data from the WAS to an existing HDAM model (step 628) and loops back to step 604 to process as before. When a "no" result is obtained in step 626, process 600 loops back to step 604 to process as before.

The design of the HDAM enables interruptions from the IPS, which may require further information on certain packets. Providing additional information is typically easy to achieve using a dedicated thread in the HDAM to direct requests from the IPS. Once a request is detected, the HDAM responds and returns control to the IPS.

Thus is presented in an illustrative embodiment a computer-implemented process for two-tier deep analysis of hypertext transport protocol data. The computer-implemented process for two-tier deep analysis of hypertext transport protocol data, the computer-implemented process comprises monitoring Web traffic, receiving a packet of Web traffic from a network to form a received packet, wherein the received packet represents Web traffic, determining whether the received packet is new traffic, responsive to a determination that the received packet is new traffic, storing the Web traffic temporarily to form stored Web traffic, determining whether the Web traffic is suspicious using a first tier analysis, responsive to a determination that the Web traffic is suspicious, consuming the stored Web traffic by a deep analysis module, determining whether the stored Web traffic is a case of misuse using a second tier analysis and responsive to a determination that the stored Web traffic is a case of misuse, feeding back data about a malicious connection to an intrusion protection system.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing a specified logical function. It should also be noted that, in some alternative implementations, the functions noted in the block might occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, and other software media that may be recognized by one skilled in the art.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, comprising:
   intercepting, from the network, a packet from the Web traffic;
   first analyzing, by an intrusion detection and prevention system, the packet to determine whether the packet is suspicious;
   flagging, upon the packet determined to be suspicious by the first analyzing, the packet to a deep analysis module separate from the intrusion detection and prevention system;
   second analyzing, based upon the flagging and by the deep analysis module, the packet to determine whether the packet is malicious by comparing contents of the packet with data provided by a web application scanner; and
   dropping, only upon the packet determined to be malicious by the second analysis, the packet, wherein
   the intrusion detection and prevention system is configured to prevent the packet from being forwarded to an intended destination of the packet,
   the first analyzing is a network level analysis, and
   the second analyzing is an application level analysis.

2. The method of claim 1, wherein
   the first analyzing is based upon a current packet connection of the packet.

3. The method of claim 1, wherein
   the web traffic is temporarily stored in a buffer, and
   the packet is retrieved, from the buffer, by the deep analysis module.

4. The method of claim 1, wherein
   the deep analysis module constructs a profile for a Web connection associated with the packet.

5. The method of claim 1, wherein
   the application level analysis is configured to identify an attack directed to exploiting a vulnerability of a web application.

6. The method of claim 1, wherein
   the intrusion detection and prevention system is in a prevention mode.

* * * * *